UNITED STATES PATENT OFFICE 1,979,676

METHOD OF TREATING BITUMEN

Orin R. Douthett, Perth Amboy, N. J., assignor to The Barber Asphalt Company, Philadelphia, Pa., a corporation of West Virginia No Drawing. Application June 8, 1928, Serial No. 284,003

14 Claims. (Cl. 196—74)

My invention relates to a method for the treatment of bitumen whereby a bitumen having a low degree of susceptibility to temperature changes may be produced. My invention also contemplates the bitumen having novel characteristics as produced by my process.

Heretofore it has been known that blowing bitumen, such as petroleum residuum, with air, steam or inert gases, more particularly when air is used, has the effect of lowering somewhat its susceptibility to temperature changes, raising the melting and flowing temperatures of the bitumen and rendering it available for certain uses such as, for example, in the production of built-up roofs, prepared roofing materials, and for waterproofing and similar purposes requiring a bituminous material of low susceptibility. However, the bitumen so produced, while improved over untreated bitumen, is not as profoundly affected as by the method in accordance with my invention and this further reduction in susceptibility makes my product more adaptable to commercial uses.

Now in accordance with my invention I effect the production of a bitumen having a relatively low susceptibility to temperature changes through the treatment of bitumen with a halogen in such limited proportion as to avoid any considerable reaction between the halogen and the hydrocarbons of the bitumen. More particularly, in accordance with my invention I subject bitumen to treatment with a halogen in small proportion and with air. Preferably the halogen is in the gaseous state and in admixture with air, the treatment of the bitumen being effected by blowing it in a heated condition with the mixture.

In accordance with my invention the bitumen subjected to treatment may be, for example, asphalt, either native, or still residuum which may be of asphaltic, or paraffin base, or mixed base. The halogen may be, for example, chlorine, iodine or the like, though chlorine will be found to be preferable.

In the carrying out of my invention preferably, as has been indicated, bitumen in a heated condition is blown with a mixture of air and a small proportion of a halogen in the gaseous state. The bitumen under treatment is preferably maintained at a temperature within about the range 450° F.-600° F. and the proportion of halogen used in the treatment will be, preferably, from a fraction of one per cent to about ten per cent by weight of the residuum treated. The rate of blowing of the residuum may be varied widely, but a rate of, for example, about thirty cubic feet of air per minute per ton of bitumen under treatment will be found to produce satisfactory results. The bitumen after treatment with the mixture of halogen and air may be advantageously blown with steam for the removal of unstable or volatile halogen compounds which may have been formed.

As a more specific illustration of the practical adaptation of my invention, for example, a quantity of still residuum, which may be of asphaltic, or paraffin base, or mixed base, is placed in a cylindrical still provided in its bottom with a perforated pipe. The asphalt is heated to a temperature preferably within the range about 475° F.-525° F. and air is introduced, as by a blower, into the asphalt through the perforated pipe at the rate of about thirty cubic feet per minute per ton of asphalt. A halogen, as for example chlorine, is introduced into the asphalt with the air in an amount of from a fraction of one per cent to about ten per cent by weight of the asphalt and preferably in an amount less than about ten per cent. The halogen, as chlorine, may be readily introduced into the asphalt with the air by connecting a cylinder of liquefied gas to the air line, and the amount of halogen admitted may be readily determined by means of a flow meter, or by periodic weighing of the cylinder containing the liquefied gas.

As a specific example of the application of my invention, a quantity of asphaltic base petroleum residuum, at a temperature of about 475° F.-525° F. was blown for a period of about three-quarters of an hour with air containing in admixture chlorine in amount equal to about 7.1% by weight of the residuum treated. The blown residuum was found to have a penetration, under 100 gram load for five seconds, of about .59 cms. at 77° F., about 1.83 cms. at a temperature of 122° F. and a ring and ball softening point of 175° F.

As a further example, a quantity of mixed base residuum, comprising a mixture of 87.5% asphaltic base residuum with 12.5% paraffin base residuum was blown with air admixed with 2.33% chlorine. The product was found to have a penetration, under 100 gram load for five seconds, of about 1.17 cms. at 77° F., of about 3.22 cms. at 122° F. and a softening point by the ring and ball method of 212° F.

As has been indicated, the bitumen after blowing may be desirably blown with steam, at say 450° F., for the removal of unstable or volatile chlorine compounds.

The treatment of bitumen in accordance with my invention, with, for example, a halogen, as chlorine, does not involve a substantial degree of chlorination so far as the composition of the new product is concerned, the concentration of chlorine being below that which would effect any substantial chlorination and consequent undesirable decomposition of the bitumen treated such as disruption of the chains or rings which form the neuclei, or the production of products of high molecular weight having a high ratio of carbon to hydrogen, or carbonization products, or cracked products, or the like, which is avoided. The product produced in accordance with my invention, using chlorine equal to eight per cent by weight of residuum treated, contained not more than 0.50% to 0.53% of chlorine. The halogen, as chlorine, in admixture with the air apparently combines to some extent with the hydrogen of the bitumen, since some hydrochloric acid gas is evolved when chlorine is used, leaving the hydrocarbons in a very reactive condition such that they readily react with the oxygen of the air which is in admixture with the chlorine. The reaction is not primarily a chlorination, when chlorine is used, since chlorine compounds are not found in the product to any considerable extent, it having been determined that when say from six per cent to ten per cent of chlorine is used, the product will contain only a fraction of one per cent of chlorine.

The bitumen produced in accordance with my invention has characteristics which make it greatly superior to that obtained by the use of air alone. The melting point and flowing temperature of the former is much higher for a given consistency than that of the latter, thus enabling its use for covering steep roofs, for waterproofing highly inclined surfaces and various purposes where being subject to elevated temperatures, bitumen treated by the use of air alone can not be satisfactorily used.

A marked improvement in bitumen produced in accordance with my invention, over that obtained by the use of air, is the low degree of susceptibility to temperature changes. That is the consistency, measured by the penetration, varies much less at different temperatures than does that of bitumen hitherto produced. Using as the initial material a mixture of residuums of an asphaltic with a paraffin base oil and proceeding in accordance with my invention a bituminous product is obtained having a higher melting point for a given penetration and a lower susceptibility than can, so far as I am aware, be obtained in any other way. Blowing such a mixture of residuums with air only, results in a product which in a short time becomes very oily due probably to the separation of paraffin oil from the asphalt, which results in a loss of the adhesive property of the asphalt and renders it unsuitable for many purposes. Using a mixture of air and a halogen, as chlorine, in accordance with my invention, a product is obtained which remains homogeneous indefinitely with reasonable amounts of paraffin base oil present, when only very small amounts of chlorine are used. When several percent of chlorine is used the product is stable with large amounts of paraffin base oil.

A further advantage in the use of a halogen, as chlorine, mixed with air, in blowing bitumen, as native asphalt, a petroleum residuum or the like, is the saving of time and power. For example, a residuum from an asphaltic base petroleum blown with air at the rate of 500 cubic feet per ton per minute, required 2½ hours to produce an asphalt having a penetration of .59 cms. under a load of 100 grams for 5 seconds at 77° F. A portion of the same residuum blown, under the same conditions, with air to which 7.1 per cent chlorine was added produced in ¾ hour an asphalt having a penetration of .54 cms. under identical conditions.

It will be understood that while, in the description of my invention, I have referred to percentages and temperature ranges, I do not thereby intend to limit my invention thereto, and it will be understood that my invention from the broad standpoint contemplates the treatment of bitumen with a halogen in amounts such as not to cause any considerable decomposition of the hydrocarbons of the bitumen, and more particularly, as by blowing with air in admixture with a halogen, the concentration of the halogen being insufficient to effect any considerable decomposition of the hydrocarbons of the bitumen. My invention is more particularly applicable to bitumen of the nature of asphaltic base, paraffin base and mixed asphaltic and paraffin base still residuum, mixtures of these with asphalt, asphalts, tars and any bituminous materials susceptible to modification by blowing with air. While I prefer to use chlorine, as a halogen, it will be understood that I may use other halogens as iodine, bromine or the like.

What I claim and desire to protect by Letters Patent is:

1. The method for lowering the susceptibility to temperature change of bitumen, which includes contacting with a bitumen in a heated condition a halogen in admixture with an oxygen containing gas, the oxygen containing gas being in amount substantially in excess of the amount of halogen.

2. The method for lowering the susceptibility to temperature change of a bitumen, which includes contacting with a bitumen in a heated condition a halogen in admixture with air, the air being in amount substantially in excess of the amount of halogen.

3. The method for lowering the susceptibility to temperature change of asphalt, which includes contacting with asphalt in a heated condition a halogen in admixture with an oxygen containing gas, the oxygen containing gas being in amount substantially in excess of the amount of halogen.

4. The method for lowering the susceptibility to temperature change of asphalt, which includes contacting with asphalt in a heated condition a halogen in admixture with air, the air being in amount substantially in excess of the amount of halogen.

5. The method for lowering the susceptibility to temperature change of a bitumen, which includes contacting with a bitumen heated to a temperature within about the range 450–600° F., a halogen in admixture with air, the air being in amount substantially in excess of the amount of halogen.

6. The method for lowering the susceptibility to temperature change of asphalt, which includes contacting with asphalt heated to a temperature within about the range 450–600° F. a halogen in admixture with air, the air being in amount substantially in excess of the amount of halogen.

7. The method for lowering the susceptibility to temperature change of a bitumen, which includes contacting with a bitumen in a heated condition chlorine in admixture with an oxygen containing gas, the oxygen containing gas being in amount in excess of the amount of chlorine.

8. The method for lowering the susceptibility to temperature change of asphalt, which includes contacting with asphalt in a heated condition chlorine in admixture with an oxygen containing gas, the oxygen containing gas being in amount in excess of the amount of chlorine.

9. The method for lowering the susceptibility to temperature change of a bitumen, which includes contacting with a bitumen in a heated condition chlorine in admixture with air, the air being in amount substantially in excess of the amount of chlorine.

10. The method for lowering the susceptibility to temperature change of asphalt, which includes contacting with asphalt in a heated condition chlorine in admixture with air, the air being in amount substantially in excess of the amount of chlorine.

11. The method for lowering the susceptibility to temperature change of bitumen, which includes blowing bitumen in a heated condition with a mixture of air and a halogen, the halogen being insufficient in amount and the temperature and concentration conditions not being such as to effect the production of any substantial amounts of non-volatile hydrocarbon-halogen compounds and blowing the product with steam.

12. The method for lowering the susceptibility to temperature change of asphalt, which includes blowing asphalt in a heated condition with air and chlorine, the chlorine being insufficient in amount and the temperature and concentration conditions not being such as to effect the production of any substantial amounts of non-volatile hydrocarbon-chlorine compounds and blowing the product with steam.

13. The method for lowering the susceptibility to temperature change of a mixed asphaltic and paraffine base petroleum residuum, which includes blowing a mixed asphaltic and paraffine base petroleum residuum in a heated condition with air and a halogen, the halogen being insufficient in amount and the temperature and concentration conditions not being such as to effect the production of any substantial amounts of non-volatile hydrocarbon-halogen compounds and blowing the product with steam.

14. The method for lowering the susceptibility to temperature change of a mixed asphaltic and paraffine base petroleum residuum, which includes blowing a mixed asphaltic and paraffine base petroleum residuum in a heated condition with air and chlorine, the chlorine being insufficient in amount and the temperature and concentration conditions not being such as to effect the production of any substantial amounts of non-volatile hydrocarbon-halogen compounds and blowing the product with steam.

ORIN R. DOUTHETT.